US010935460B2

(12) United States Patent
Stowe et al.

(10) Patent No.: US 10,935,460 B2
(45) Date of Patent: Mar. 2, 2021

(54) ULTRASONIC TANK FOR A TURBOMACHINE

(71) Applicant: General Electric Company, Schenectady, NY (US)

(72) Inventors: Michael Todd Stowe, Liberty Township, OH (US); Herbert Chidsey Roberts, Middletown, OH (US); Lyle Timothy Rasch, Fairfield, OH (US); Michael Dean Fullington, West Chester, OH (US); Wayne Ray Grady, Hamilton, OH (US); David Scott Diwinsky, West Chester, OH (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 16/037,308

(22) Filed: Jul. 17, 2018

(65) Prior Publication Data
US 2020/0025649 A1  Jan. 23, 2020

(51) Int. Cl.
*G01M 15/02*  (2006.01)
*F01D 25/00*  (2006.01)
*G01M 15/14*  (2006.01)
*G01N 29/28*  (2006.01)
*F01D 5/12*  (2006.01)
*F01D 9/04*  (2006.01)

(52) U.S. Cl.
CPC ............ *G01M 15/02* (2013.01); *F01D 25/00* (2013.01); *G01M 15/14* (2013.01); *G01N 29/28* (2013.01); *F01D 5/12* (2013.01); *F01D 9/041* (2013.01); *F05D 2220/323* (2013.01); *F05D 2240/12* (2013.01); *F05D 2240/30* (2013.01); *F05D 2260/80* (2013.01)

(58) Field of Classification Search
CPC ...... G01M 15/02; G01M 15/14; G01N 29/28; F01D 25/00; F05D 2220/323
See application file for complete search history.

(56) References Cited

U.S. PATENT DOCUMENTS

| 2,366,164 A | 1/1945 | Weick et al. |
| 4,910,823 A | 3/1990 | Silverman et al. |
| 6,073,637 A | 6/2000 | Hayward et al. |

(Continued)

FOREIGN PATENT DOCUMENTS

| EP | 2752559 A1 | 7/2014 |
| EP | 3167966 A2 | 5/2017 |
| JP | 2013056316 A | 3/2013 |

OTHER PUBLICATIONS

European Search Report Corresponding to Application No. 19185694 on dated Dec. 13, 2019.

*Primary Examiner* — David Z Huang
(74) *Attorney, Agent, or Firm* — Dority & Manning, P.A.

(57) ABSTRACT

A system for performing ultrasonic procedures within a turbomachine. The system includes a bladder and a probe assembly. The bladder includes a bladder body for positioning within the turbomachine. Further, the bladder is inflatable to at least partially define an ultrasonic tank within the turbomachine for containing a fluid medium. The probe assembly includes an extension member and ultrasonic transmitter coupled to or positioned within the extension member. The extension member is insertable into the ultrasonic tank for positioning the ultrasonic transmitter within the ultrasonic tank.

18 Claims, 8 Drawing Sheets

(56) References Cited

U.S. PATENT DOCUMENTS

| | | |
|---|---|---|
| 6,206,067 B1 | 3/2001 | Kociemba et al. |
| 6,270,603 B1 | 8/2001 | Westerman et al. |
| 6,394,108 B1 | 5/2002 | Butler |
| 6,487,922 B1 * | 12/2002 | Bauer .................. G01N 29/225 356/3.03 |
| 6,542,230 B1 | 4/2003 | Luke |
| 6,640,437 B2 | 11/2003 | McFarland |
| 6,671,938 B2 | 1/2004 | McFarland |
| 6,880,402 B1 * | 4/2005 | Couet ...................... B08B 3/12 73/579 |
| 7,032,279 B2 | 4/2006 | McCarvill et al. |
| 7,278,208 B2 | 10/2007 | LeSaint et al. |
| 7,406,971 B2 | 8/2008 | Velez, Jr. |
| 7,445,677 B1 | 11/2008 | Asplund |
| 7,810,696 B2 | 10/2010 | Nunnery |
| 8,801,502 B2 | 8/2014 | Ng et al. |
| 8,927,897 B2 | 1/2015 | Xu et al. |
| 8,991,047 B2 | 3/2015 | Anasis et al. |
| 9,643,222 B2 | 5/2017 | Clossen-Von Lanken Schulz et al. |
| 9,856,037 B2 | 1/2018 | Georgeson |
| 9,970,326 B2 | 5/2018 | Roberts et al. |
| 2006/0042083 A1 | 3/2006 | Baker et al. |
| 2007/0068551 A1 | 3/2007 | Garimella |
| 2009/0293906 A1 | 12/2009 | Baddeley |
| 2014/0000372 A1 * | 1/2014 | Bessri .................... G01N 29/24 73/644 |
| 2015/0034266 A1 | 2/2015 | Bruck et al. |
| 2015/0174838 A1 | 6/2015 | Kittleson et al. |
| 2015/0197712 A1 | 7/2015 | Ekanayake et al. |
| 2015/0260690 A1 * | 9/2015 | Rasselkorde ........ G01N 29/262 73/623 |
| 2017/0130649 A1 | 5/2017 | Bewlay et al. |
| 2017/0239762 A1 | 8/2017 | Roberts et al. |
| 2017/0254221 A1 | 9/2017 | Roberts et al. |

\* cited by examiner

ULTRASONIC TANK FOR A TURBOMACHINE

FIELD

The present subject matter relates generally to turbomachines and, more particularly, to systems and methods for performing ultrasonic procedures on an internal component of a turbomachine.

BACKGROUND

A gas turbine engine typically includes a turbomachinery core having a high pressure compressor, combustor, and high pressure turbine in a serial flow relationship. The core is operable in a known manner to generate a primary gas flow. The high pressure compressor includes annular arrays ("rows") of stationary vanes that direct air entering the engine into downstream, rotating blades of the compressor. Collectively one row of compressor vanes and one row of compressor blades make up a "stage" of the compressor. Similarly, the high pressure turbine includes annular rows of stationary nozzle vanes that direct the gases exiting the combustor into downstream, rotating blades of the turbine. Collectively one row of nozzle vanes and one row of turbine blades make up a "stage" of the turbine. Typically, both the compressor and turbine include a plurality of successive stages.

Gas turbine engines, particularly aircraft engines, require a high degree of periodic maintenance. For example, periodic maintenance is often scheduled to allow internal components of the engine to be inspected for defects and subsequently repaired and/or for internal components to be cleaned. Generally, gas turbine engines may build up deposits such as carbon buildup, dust, dirt, etc. Unfortunately, many conventional inspection and cleaning methods used for aircraft engines require that the engine be removed from the body of the aircraft and subsequently partially or fully disassembled. As such, these inspection and cleaning methods result in a significant increase in both the time and the costs associated with inspecting and/or cleaning internal engine components.

However, performing in situ service or inspection procedures on gas turbines is complicated because some of the inspection or service procedures can unintentionally harm portions of the gas turbine due to fluid or gas based over spray, or waste particles created during material removal operations. Accordingly, a system and method for performing an in situ cleaning and/or examination of internal component of a gas turbine engine would be welcomed within the technology.

BRIEF DESCRIPTION

Aspects and advantages will be set forth in part in the following description, or may be obvious from the description, or may be learned through practice of the invention.

In one aspect, the present disclosure is directed to a system for performing ultrasonic procedures within a turbomachine. The system includes a bladder and a probe assembly. The bladder includes a bladder body for positioning within the turbomachine. Further, the bladder is inflatable to at least partially define an ultrasonic tank within the turbomachine for containing a fluid medium. The probe assembly includes an extension member and ultrasonic transmitter coupled to or positioned within the extension member. The extension member is insertable into the ultrasonic tank for positioning the ultrasonic transmitter within the ultrasonic tank.

In one embodiment, the probe assembly may further include an ultrasonic receiver coupled to or positioned within the extension member. The ultrasonic receiver may receive at least a portion of the ultrasonic waves after the ultrasonic waves have reflected off the turbomachine. In another embodiment, the probe assembly may be a snake arm assembly. Such that, the extension member may be a snake arm of the snake arm assembly. In a further embodiment, the system may further include a fluid source fluidly coupled to the bladder for inflating the bladder. In another embodiment, the fluid medium may include a cleaning fluid. In a still further embodiment, the bladder may include at least one of a plastic material, a film, a fibrous web, a rubber material, or a paper material.

In another embodiment, the bladder may be a first bladder, and the bladder body is a first bladder body. In such embodiments, the system may further include a second bladder including a second bladder body for positioning within the turbomachine. As such, the second bladder body may be inflatable to at least partially define the ultrasonic tank. In further such embodiment, the first bladder may be positioned at an upstream location within the turbomachine, and the second bladder may be positioned at a downstream location within the turbomachine. The first and second bladders may define the ultrasonic tank therebetween. In another such embodiment, the turbomachine may include a component. The first bladder may be positioned upstream of the component, and the second bladder may be positioned downstream of the component for at least one of ultrasonic cleaning, inspection, or modeling of the component.

In another aspect, the present disclosure is directed to a method for performing an ultrasonic procedure within a turbomachine including a component. The method includes positioning a bladder within the turbomachine to at least partially define an ultrasonic tank within the turbomachine. The method further includes providing the ultrasonic tank with a fluid medium. In another step, the method includes positioning an ultrasonic transmitter of a probe assembly into the ultrasonic tank. The method additionally includes emitting ultrasonic waves from the ultrasonic transmitter through the fluid medium to the component of the turbomachine.

In one embodiment of the method, the turbomachine may be in situ. In a further embodiment of the method, the component may be positioned at least partially within ultrasonic tank. In yet another embodiment of the method, emitting ultrasonic waves from the ultrasonic transmitter through the fluid medium to the component of the turbomachine may include removing deposits on the component. In one embodiment, the method may include positioning a second bladder within the turbomachine to at least partially define the ultrasonic tank. In another embodiment, the method may include repositioning the ultrasonic transmitter of the probe assembly within the ultrasonic tank.

In a further embodiment, the method may include positioning an ultrasonic receiver of the probe assembly into the ultrasonic tank and sensing data indicative of reflected ultrasonic waves off of the component with the ultrasonic receiver. In such an embodiment, the method may include inspecting the data indicative of the reflected ultrasonic waves for an undesirable characteristic on or within the component. In further such embodiments, the undesirable characteristic may be at least one of damage to the component, wear to the component, or deposit build-up on the component. Some embodiments of the method may include building a model of at least a portion of the turbomachine using the data indicative of the reflected ultrasonic waves. It should be further understood that the method may further include any of the additional features as described herein.

In yet another aspect, the present disclosure is directed to a turbomachine assembly. The turbomachine assembly includes a turbomachine having a component and an ultrasonic system. The ultrasonic system includes a bladder and a probe assembly. The bladder includes a bladder body for positioning within the turbomachine. Further, the bladder is inflatable to at least partially define an ultrasonic tank within the turbomachine for containing a fluid medium. The probe assembly includes an extension member and ultrasonic transmitter coupled to or positioned within the extension member. The extension member is insertable into the ultrasonic tank for positioning the ultrasonic transmitter within the ultrasonic tank. It should be further understood that the turbomachine assembly may further include any of the additional features as described herein.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
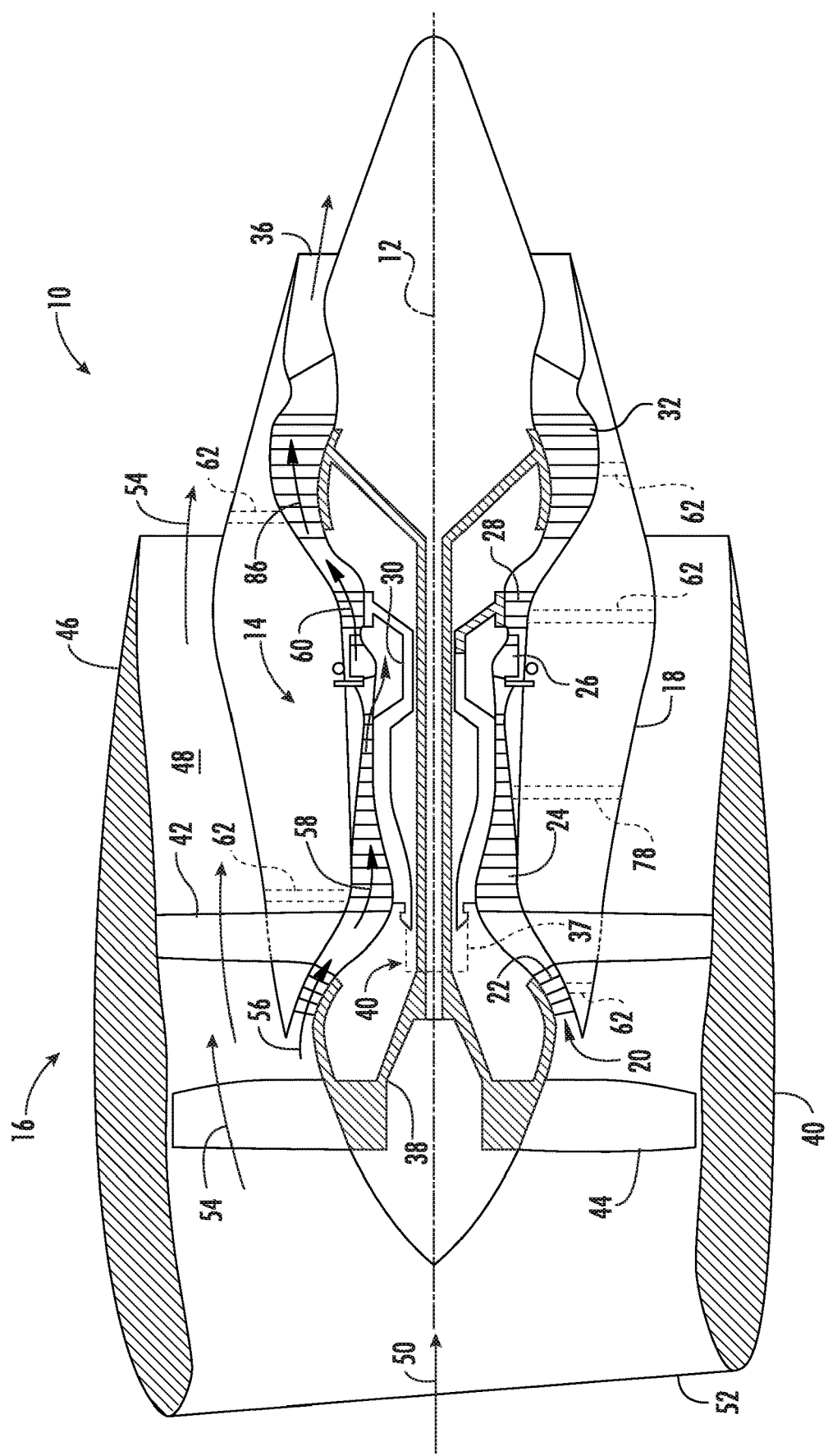
FIG. 1 illustrates a cross-sectional view of one embodiment of a turbomachine according to the present disclosure, particularly illustrating an embodiment where the turbomachine is a gas turbine engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The terms "communicate," "communicating," "communicative," and the like refer to both direct communication as well as indirect communication such as through a memory system or another intermediary system.

In general, systems and methods are provided for performing ultrasonic procedures within a turbomachine. In certain embodiments, the turbomachine may be a gas turbine engine on-wing (or in situ). It should be appreciated that, although the present subject matter will generally be described herein with reference to an ultrasonic probe within a gas turbine engine, the disclosed system and method may be generally used within any suitable type of turbine engine, including aircraft-based turbine engines, land-based turbine engines, and/or steam turbine engines, regardless of the current assembly state of the engine (e.g., fully or partially assembled). Additionally, with reference to aircraft engines, it should be appreciated that the present subject matter may be used in situ or off wing.

Furthermore, it should be appreciated that, although the present subject matter will generally be described herein with reference to inserting an ultrasonic probe within a turbomachine, the disclosed system and method may be generally used to insert any probe within any type of apparatus. More specifically, the system and method may generally be used on any apparatus with internal structure that is difficult to access and/or inspect. In certain other embodiments, the probe may be inserted within any apparatus such as a mechanical or organic body with cavities, orifices, tubes, etc. for the examination and/or cleaning thereof.

Referring now to the drawings, FIG. 1 illustrates a cross-sectional view of one embodiment of a turbomachine 10 that the ultrasonic system 110 (see, e.g., FIG. 2) may be utilized in. The turbomachine 10 is shown having a longitudinal or axial centerline axis 12 extending therethrough for reference purposes. The centerline axis 12 defines a longitudinal direction extending along the centerline axis 12, a radial direction extending perpendicular to the centerline axis 12, and a circumferential direction extending perpendicular to both the radial direction and the longitudinal direction. In the depicted embodiment, the turbomachine 10 is a gas turbine engine. It should be recognized that, in other embodiments, the ultrasonic system 110 may be used with any apparatus including a mechanical or organic body with cavities, orifices, tubes, etc. for the inspection and/or cleaning thereof.

In general, the engine may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products 60 are directed from the combustor 26 along the hot gas path of the engine to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products 60 may be expelled from the core engine 14 via an exhaust nozzle 36 to provide propulsive jet thrust.

Additionally, as shown in FIG. 1, the fan section 16 of the turbomachine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) 37 may also be provided between any other suitable shafts and/or spools within the engine as desired or required.

During operation of the engine, it should be appreciated that an initial air flow (indicated by arrow 50) may enter the engine through an associated inlet 52 of the fan casing 40. The air flow 50 then passes through the fan rotor blades 44 and splits into a first compressed air flow (indicated by arrow 54) that moves through the by-pass conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the high pressure turbine 28. Thereafter, the combustion products 60 flow through the low pressure turbine 32 and exit the exhaust nozzle 36 to provide thrust for the engine.

The gas turbine engine may also include a plurality of access ports 62 defined through its casings and/or frames for providing access to the interior of the core engine 14. For instance, as shown in FIG. 1, the turbomachine 10 may include the plurality of access ports 62 (only six of which are shown) defined through the outer casing 18 for providing internal access to one or both of the compressors 22, 24 and/or for providing internal access to one or both of the turbines 28, 32. In several embodiments, the access ports 62 may be spaced apart axially along the core engine 14. For instance, the access ports 62 may be spaced apart axially along each compressor 22, 24 and/or each turbine 28, 32 such that at least one access port 62 is located at each compressor stage and/or each turbine stage for providing access to the internal components located at such stage(s). In addition, the access ports 62 may also be spaced apart circumferentially around the core engine 14. For instance, a plurality of access ports 62 may be spaced apart circumferentially around each compressor stage and/or turbine stage.

It should be appreciated that, although the access ports 62 are generally described herein with reference to providing internal access to one or both of the compressors 22, 24 and/or for providing internal access to one or both of the turbines 28, 32, the gas turbine engine may include access ports 62 providing access to any suitable internal location of the turbomachine 10, such as by including access ports 62 that provide access within the combustor 26 and/or any other suitable component of the engine.

Figure 2:
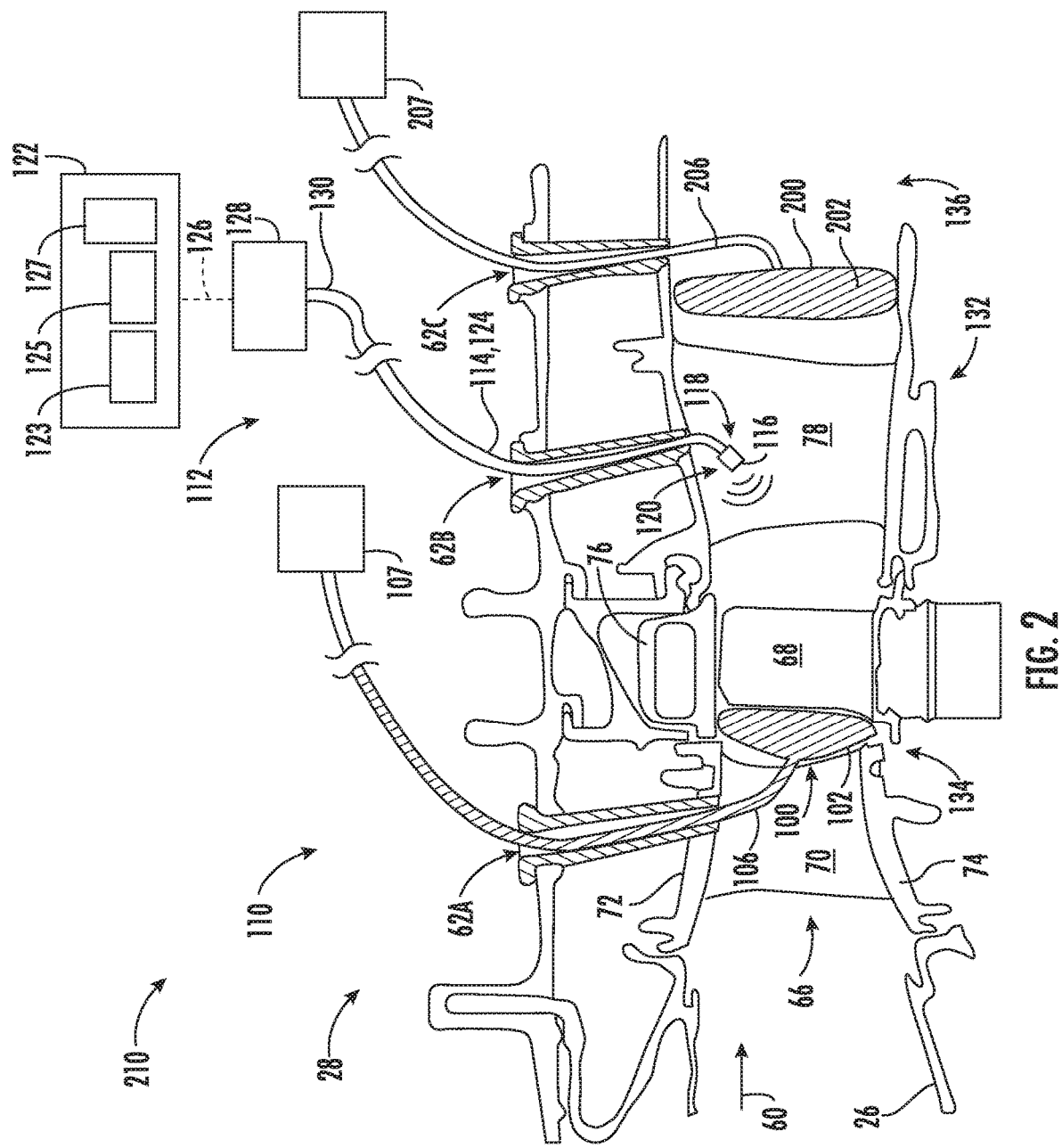
FIG. 2 illustrates a partial, cross-sectional view of a high pressure turbine according to aspects of the present disclosure, particularly illustrating an ultrasonic system inserted in the high pressure turbine of the turbomachine.

Referring now to FIG. 2, a partial, cross-sectional view of the high pressure turbine 28 described above with reference to FIG. 1 is illustrated in accordance with aspects of the present subject matter. As shown, the high pressure turbine 28 may include a first stage turbine nozzle 66 and an annular array of rotating turbine blades 68 (one of which is shown) located immediately downstream of the first stage turbine nozzle 66. The first stage turbine nozzle 66 may generally be defined by an annular flow channel that includes a plurality of radially-extending, circularly-spaced nozzle vanes 70 (one of which is shown). The nozzle vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (see e.g., FIG. 1) of the engine. Moreover, a turbine shroud 76 may be positioned immediately adjacent to the radially outer tips of the turbine blades 68 so as to define the outer radial flowpath boundary for the combustion products 60 flowing through the high pressure turbine 28 along the hot gas path of the engine.

As indicated above, the high pressure turbine 28 may generally include any number of turbine stages, with each stage including an annular array of nozzle vanes 78 and follow-up turbine blades 68. For example, as shown in FIG. 2, an annular array of nozzle vanes 78 of a second stage of the high pressure turbine 28 may be located immediately downstream of the turbine blades 68 of the first stage of the high pressure turbine 28.

Moreover, as shown in FIG. 2, a plurality of access ports 62 may be defined through the turbine casing and/or frame, with each access port 62 being configured to provide access to the interior of the high pressure turbine 28 at a different axial location. Specifically, as indicated above, the access ports 62 may, in several embodiments, be spaced apart axially such that each access port 62 is aligned with or otherwise provides interior access to a different stage of the high pressure turbine 28. For instance, as shown in FIG. 2, a first access port 62A may be defined through the turbine casing/frame to provide access to the first stage of the high pressure turbine 28 while a second access port 62B may be defined through the turbine casing/frame to provide access to the second stage of the high pressure turbine 28. Further, a third access port 62C may be defined through the turbine casing/frame to provide access to the third stage of the high pressure turbine 28.

It should be appreciated that similar access ports 62 may also be provided for any other stages of the high pressure turbine 28 and/or for any turbine stages of the low pressure turbine 32. It should also be appreciated that, in addition to the axially spaced access ports 62 shown in FIG. 2, access ports 62 may be also provided at differing circumferentially spaced locations. For instance, in one embodiment, a plurality of circumferentially spaced access ports may be defined through the turbine casing/frame at each turbine stage to provide interior access to the high pressure turbine 28 at multiple circumferential locations around the turbine stage.

Figure 3:
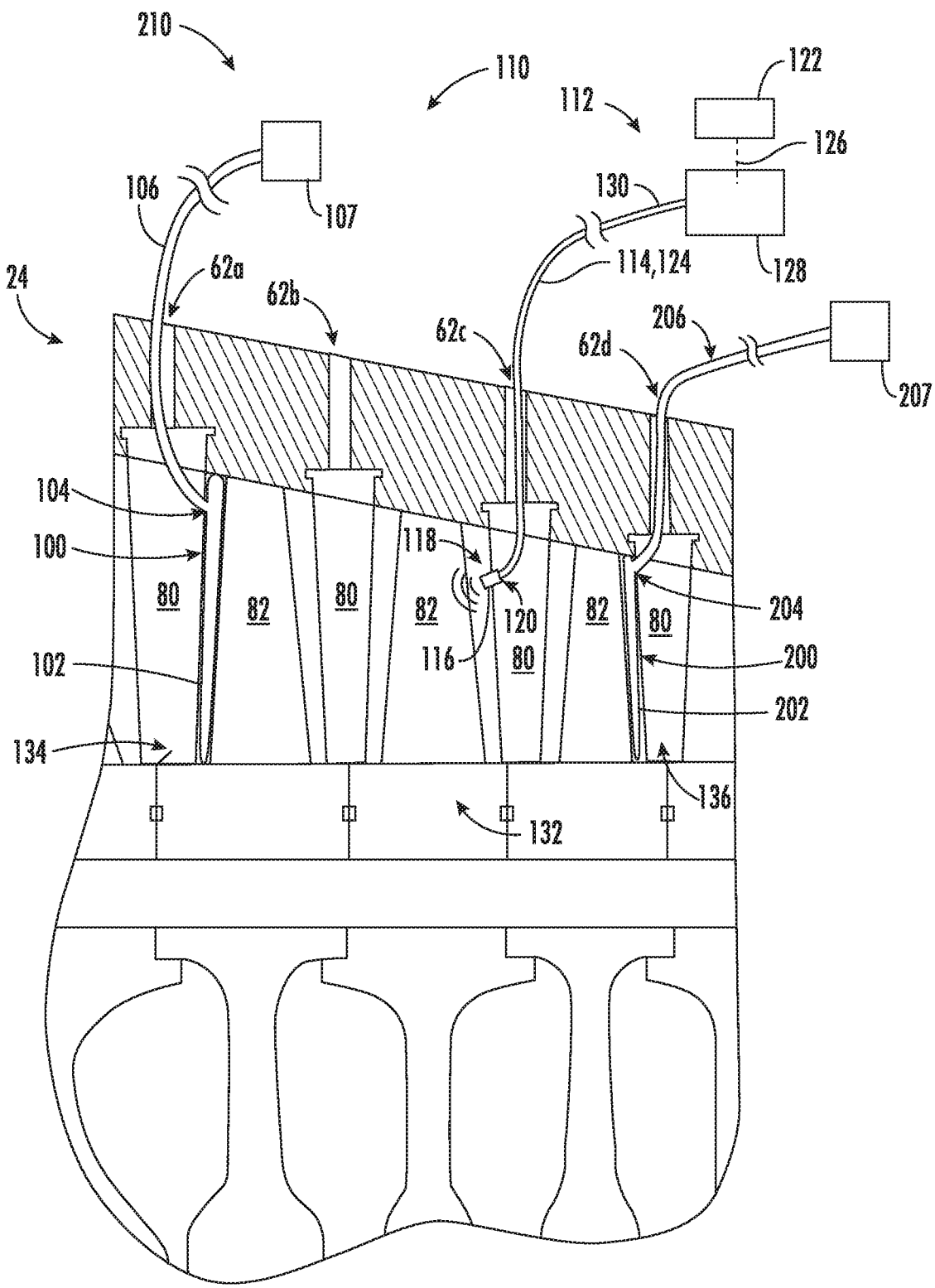
FIG. 3 illustrates a partial, cross-sectional view of a high pressure compressor according to aspects of the present disclosure, particularly illustrating the ultrasonic system inserted in the high pressure compressor of the turbomachine.

Referring now to FIG. 3, a partial, cross-sectional view of the high pressure compressor 24 described above with reference to FIG. 1 is illustrated in accordance with aspects of the present subject matter. As shown, the high pressure compressor 24 may include a plurality of compressor stages, with each stage including both an annular array of fixed compressor vanes 80 (only one of which is shown for each stage) and an annular array of rotatable compressor blades 82 (only one of which is shown for each stage). Each row of compressor vanes 80 is generally configured to direct air flowing through the high pressure compressor 24 to the row of compressor blades 82 immediately downstream thereof.

Moreover, the high pressure compressor 24 may include a plurality of access ports 62 defined through the compressor casing/frame, with each access port 62 being configured to provide access to the interior of the high pressure compressor 24 at a different axial location. Specifically, in several embodiments, the access ports 62 may be spaced apart axially such that each access port 62 is aligned with or otherwise provides interior access to a different stage of the high pressure compressor 24. For instance, as shown in FIG. 3, first, second, third, and fourth access ports 62a, 62b, 62c, 62d are illustrated that provide access to four successive stages, respectively, of the high pressure compressor 24.

It should be appreciated that similar access ports 62 may also be provided for any of the other stages of the high pressure compressor 24 and/or for any of the stages of the booster compressor 22. It should also be appreciated that, in addition to the axially spaced access ports 62 shown in FIG. 3, access ports 62 may be also provided at differing circumferentially spaced locations. For instance, in one embodiment, a plurality of circumferentially spaced access ports 62 may be defined through the compressor casing/frame at each compressor stage to provide interior access to the high pressure compressor 24 at multiple circumferential locations around the compressor stage.

Referring now to FIGS. 2 and 3, two embodiments of a turbomachine assembly 210 are illustrated in accordance with aspects of the present subject matter. The turbomachine assembly 210 includes the turbomachine 10, such as the high pressure turbine 28 of FIG. 2 or the high pressure compressor 24 of FIG. 3. The turbomachine 10 has a component, such as, but not limited to the turbine blade 68, the nozzle vane 78, the compressor vane 80, and/or the compressor blade 82. The turbomachine assembly 210 further includes an ultrasonic system 110 for performing ultrasonic procedures within the turbomachine 10. It should be recognized that, in other embodiments, the ultrasonic system 110 may be utilized in any other apparatus, such as a mechanical or organic body with cavities, orifices, tubes, etc. for the examination and/or cleaning thereof. Further, in certain embodiments, the turbomachine 10 may be in situ. Generally, the turbomachine 10 positioned on-wing of an aircraft may be referred to as in situ. In further embodiments, the turbomachine 10 may be off-wing and/or fully or partially disassembled.

The ultrasonic system 110 includes a probe assembly 112 including an extension member 114 and an ultrasonic transmitter 116. The ultrasonic transmitter is coupled to or positioned within the extension member 114. For example, in the illustrated embodiments, the ultrasonic transmitter 116 (as discussed in more detail in regards to FIGS. 6-8) is positioned at an end 118 of the extension member 114. In certain embodiments, the extension member 114 may be a cable 124.

In certain embodiments, the probe assembly 112 may include a computer 122 communicatively coupled to the extension member 114. In general, the computer 122 may correspond to any suitable processor-based device and/or any suitable combination of processor-based devices. The computer 122 may be communicatively coupled to the probe assembly 112 via a communicative link and/or cable 126. Thus, in several embodiments, the computer 122 may include one or more processor(s) 123 and associated memory device(s) 125 configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and/or other programmable circuits. Furthermore, the computer 122 may include a display 127.

Additionally, the memory device(s) 125 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory device(s) 125 may generally be configured to store suitable computer-readable instructions that, when implemented by the processor(s) 123, configure the computer 122 to perform various functions including, but not limited to, the methods and/or steps described herein.

Still referring now FIGS. 2 and 3, as shown, the extension member 114 has been inserted through an access port 62 of the turbomachine 10. For the illustrated embodiment, the extension member 114 may include at least one sensor 120 at the end 118. For the exemplary embodiment, the sensor 120 produces a signal that is communicated through the cable 124 and to the computer 122 via the communicative link or cable 126. In certain embodiments, the sensor 120 may be an optical sensor to allow images and/or video of the interior of the turbomachine 10 to be captured or otherwise obtained. It should be recognized that, in other embodiments, the computer 122 may be in wireless communication with the sensor 120 and/or the extension member 114. Additionally, a light source, such as an LED, may be provided at or adjacent to the end 118 to provide lighting within the interior of the turbomachine 10. In the shown embodiment, the computer 122 is configured to orient and feed the extension member 114 while it is inserted and oriented into the turbomachine 10. For example, the computer 122 may send signals via the communicative cable 126 to the extension member 114 to change the orientation of the extension member 114.

In the depicted embodiments, the probe assembly 112 may include an articulation assembly 128 that allows the orientation of the extension member 114 and/or the end 118 to be adjusted within the interior of the turbomachine 10. Further, the extension member 114 may extend from the articulation assembly 128 at a base 130. For example, the articulation assembly 128 may allow for the manipulation of the extension member 114 such as to extend the extension member 114, retract the extension member 114, and/or to change the shape of the extension member 114. Further, the end 118 may be rotated or pivoted about a single axis or multiples axes to adjust the orientation of the end 118 relative to the remainder of the extension member 114.

It should be appreciated that the articulation assembly 128 may generally have any suitable configuration and/or may include any suitable components that allow for adjustment of the orientation of the extension member 114 and/or the end 118 relative to the remainder of the extension member 114. For example, in one embodiment, a plurality of articulation cables may be coupled between the end 118 and one or more articulation motors. In such an embodiment, by adjusting the tension of the articulation cables via the articulation motor(s), the end 118 may be reoriented within the turbomachine 10.

In another embodiment, the probe assembly 112 may be a snake arm assembly. In such embodiment, the extension member 114 may be a snake arm of the snake arm assembly. In such an embodiment, the extension member 114 may include a plurality of segments joined by a respective plurality of joints movable relative to one another by the articulation assembly 128. For example, the articulation cables may extend to individual segments of the extension member 114 to reorientate the segments and therefore the extension member 114. In other embodiments, the articulation assembly 128 may include one or more separate actuators for adjusting the orientation of the snake arm, such as the orientation of the segments and/or joints. Further, the cable 124 may house the segments. It should be recognized that the segments may provide rigidity to the cable 124 and therefore may selectably fix the snake arm in a desired orientation and/or shape. However, in other embodiments, the snake arm may not include the outer structure of the cable 124 and instead may be formed generally by the plurality of segments.

Briefly, it will be appreciated that the snake arm may define certain parameters to further enable it to reach relatively remote positions within the interior of the turbomachine 10. More specifically, for the embodiment shown, the snake arm may define a length between the base 130 in the end 118 of least about thirty-six (36) inches, such as at least about forty-eight (48) inches, such as at least about sixty (60) inches, such as up to about 600 inches. Similarly, the snake arm may define a maximum diameter between the base 130 and the end 118, which for the embodiment depicted may be a maximum diameter of each of the segments of the snake arm, less than about five (5) inches. For example, the maximum diameter of the snake arm may be less than about three (3) inches, such as less than about 2.5 inches, such as less than about one (1) inch. Such may further allow the snake arm to reach relatively remote locations within the interior of the turbomachine 10.

It should also be appreciated that, in several embodiments, the articulation assembly 128 may be configured to be electronically controlled. Specifically, as shown in FIGS. 2 and 3, the computer 122 may be communicatively coupled to the articulation assembly 128 to allow the computer 122 to adjust the orientation of the extension member 114 and/or the end 118 via control of the articulation assembly 128.

As depicted in the embodiments of FIGS. 2 and 3, the ultrasonic system 110 includes a bladder positioned within the turbomachine 10. At least one bladder can be installed within the turbomachine 10 to form a circumferential seal therein. Referring particularly to FIG. 2, the bladder is a first bladder 100 and is installed and positioned between the plurality of first stage turbine nozzles 66 and the annular array of rotating turbine blades 68. For example, the first bladder 100 may be installed by inserting the first bladder 100, in an uninflated state, through one of the access ports 62. Then, the first bladder 100 can be inflated using an inflating fluid, such as a liquid, foam, or a gas. Referring particularly to FIG. 3, the first bladder 100 may be installed and positioned within a compressor stage (i.e., between a first annular array of fixed compressor vanes 80 and a first annular array of rotatable compressor blades 82).

The first bladder 100 may be inflatable to at least partially define an ultrasonic tank 132 within the turbomachine 10 for containing a fluid medium. For example, the bladder 100 and at least a portion of the core engine 14, such as the segment of the high pressure turbine 28 shown in FIG. 2 or the segment of the high pressure compressor 24 shown in FIG. 3, may define the ultrasonic tank 132. Further, it should be recognized that inflating the bladder 100 to form the circumferential seal with the turbomachine 10 may prevent the fluid medium from leaking out of the ultrasonic tank 132.

In the depicted embodiments, a second bladder 200 may be positioned within the turbomachine 10 and inflated to at least partially define the ultrasonic tank 132 within the turbomachine 10. For example, the first bladder 100 may be positioned at an upstream location 134 and the second bladder 200 may be positioned at a downstream location 136. It will be appreciated that as used herein, the terms upstream location 134 and downstream location 136 may refer to any two points within the engine, so long as the upstream location 134 is positioned upstream of the downstream location 136. Referring particularly to FIG. 2, the second bladder 200 may be installed and positioned within another stage of high pressure turbine 28, such as between downstream nozzle vanes 78 and downstream turbine blades 68 (not shown). Referring particularly to FIG. 3, the second bladder 200 may be installed and positioned within another stage of the high pressure compressor 24, such as between downstream compressor vanes 80 and downstream compressor blades 82. As such, the first bladder 100 and the second bladder 200 may, after inflating, seal the area therebetween to isolate that area from the other areas of the engine and form the ultrasonic tank 132. Further, a component (such as any of nozzle vanes 78, turbine blades 68, compressor vanes 80, compressor blades 82, or any other component of the turbomachine 10) may be positioned within the ultrasonic tank 132 for at least one of ultrasonic cleaning, inspection, or modeling of such component.

In the embodiments of FIGS. 2 and 3, the first bladder 100 and second bladder 200 can be inflated by supplying the fluid through an inlet 104, 204 through a supply tube 106, 206 from a fluid source 107, 207, respectively.

Figure 4:
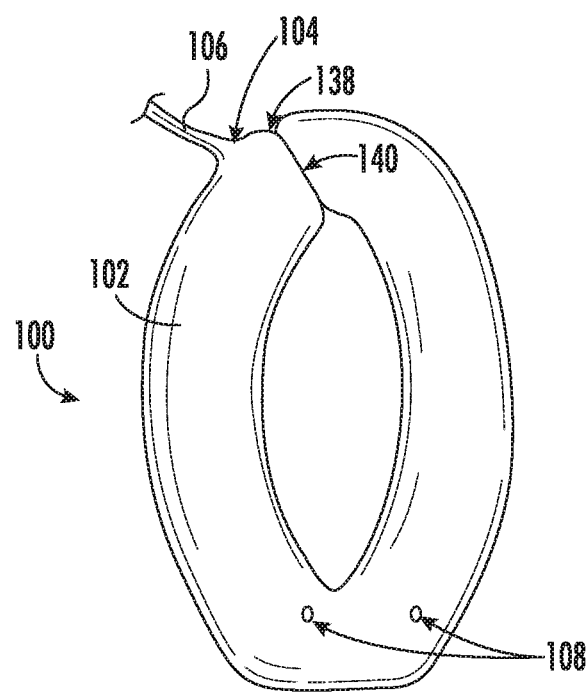
FIG. 4 illustrates a pictorial view of a bladder of the ultrasonic system according to aspects of the present disclosure, particularly illustrating a bladder able to supply a fluid medium to an ultrasonic tank.

Referring now to FIG. 4, providing a perspective view of the first bladder 100, for the embodiment shown, the supply tube 106 may be integral to a bladder body 102 so as to inflate the bladder body 102 between a first end 138 and a second end 140. Upon inflation, the bladder body 102 may expand in its respective circumferential direction and in its respective longitudinal direction (the circumferential and longitudinal directions described generally in regards to FIG. 1) between the first end 138 and a second end 140. Thus, the inflated bladder body 102 may fill the local space within the engine within which it is positioned. For example, the inflated bladder body 102 can extend between adjacent components within the engine (e.g., a row of stator vanes and an annular array of rotating blades, while contacting the arcuate outer band 72 and arcuate inner bands 74 as shown in FIG. 2). Additionally, the expansion in its respective circumferential direction allows the bladder body 102 to expand circumferentially within the engine such that the first end 138 contacts the second end 140 to form a seal therebetween.

It should be recognized that, in certain embodiments, inflating the bladder body 102 may extend the bladder body 102 via eversion. For example, when inflated, the bladder body 102 may turn inside out in order to provide more bladder body 102 to inflate. Further, a length and curvature of the bladder body 102 provided by eversion may approximate the circumference of the local space where the first bladder 100 is positioned.

In the embodiment shown, the inlet 104 is positioned at the first end 138 of the bladder body 102. In this embodiment, the second end 140 can be inserted as desired within the engine, with the bladder body 102 trailing. For example, the second end 140 can be attached to a fiber optic cable delivery system (not shown) and positioned within the engine as desired. However, in other embodiments, the inlet 104 can be positioned in another position on the bladder body 102.

It should be recognized that, in certain embodiments, the second bladder 200 may include a bladder body 202. Further, the bladder body 202 of the second bladder 200 may generally be configured as the bladder body 102 of the first bladder 100.

In one embodiment, the material of the first and second bladders 100, 200 may be a fluid impermeable material (e.g., a liquid impermeable material and/or a gas impermeable material). In another embodiment, the material of the first and second bladders 100, 200 may be somewhat impermeable to the inflating fluid so as to allow for slow passing of the fluid through the bladders 100, 200 (e.g., at a flow through rate that is slower than the supply rate of the inflating fluid). The first and second bladders 100, 200 can be constructed of a deformable material, such as a plastic material (e.g., a plastic film, a plastic fibrous web, etc.), a rubber material, a paper material (e.g., a saturated paper material), or another material.

In one embodiment, at least one exit port 108 may be included in the bladder body 102 as shown in FIG. 4. Such an exit port 108 may be configured to supply the inflating fluid into the engine, particularly as in the embodiments shown in FIGS. 2 and 3, so as to supply the fluid medium into the ultrasonic tank 132. As stated, the first bladder 100 can be inflated using an inflating fluid, such as a liquid, foam, or gas. For example, in one embodiment, the inflating fluid can include water, an inert gas, a cleaning fluid (defined below), etc. The inflating fluid can be supplied through the inlet 104 at a supply rate of fluid flow that is greater than (i.e., faster than) the fluid outflow rate through the exit ports 108. As such, the bladder body 102 may remain in its fully inflated state so as to keep the circumferential seal within the engine while still supplying the inflating fluid/fluid medium into the engine through the exit port 108. It should be recognized that, in other embodiments, the fluid medium may be supplied from other sources, such as one or more of the access ports 62. Further, in certain embodiments, a line may extend along the extension member 114 to supply the fluid medium at the end 118 of the of the extension member 114. It should be recognized that in embodiments with a cable 124, such line may be housed within the cable 124 or be attached to an exterior surface of the cable 124.

In further embodiments, the extension member 114 may be inserted into a housing of a component such as the speed reduction device 37, a gearbox, a transmission, etc. of the turbomachine 10. Further, such component may already contain an in situ fluid such as a lubricant, coolant, and/or oil. As such, the fluid medium may be the in situ fluid. Further, it should be recognized that the housing of the component may at least partially define the ultrasonic tank 132. For example, at least one bladder 100 may be inserted into the housing of the component and at least partially define the ultrasonic tank 132 within the housing. In other embodiments, the ultrasonic tank 132 may be defined generally by the housing of the component. For example, the bladder 100 may not be necessary to define the ultrasonic tank 132 within the housing of the component.

Figure 5:
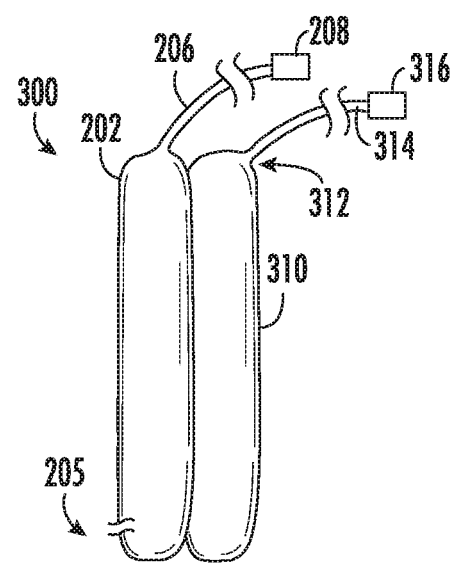
FIG. 5 illustrates a side view of a bladder of the ultrasonic system according to aspects of the present disclosure, particularly illustrating a recovery bladder able to remove the fluid medium from the ultrasonic tank.

In one embodiment, the second bladder 200 may be configured to recover the fluid from within the ultrasonic tank 132. Referring to FIG. 5, an embodiment of a recovery bladder 300 is generally shown, which includes the second bladder body 202 configured as a recovery body having a recovery port 205 exposed to the ultrasonic tank 132. The recovery body can be in fluid communication with a pump 208, through the supply tube 206 configured as a recovery tube, to remove the fluid medium from the ultrasonic tank 132 supplied from the first bladder 100. The recovery bladder 300 can also include an adjacent to and/or attached to a third bladder body 310. The third bladder body 310 may include an inlet 312 fluidly coupled to a supply tube 314 and a supply tank 316. The third bladder body 310 may be inflated through the inlet 312 from the supply tube 314 and the supply tank 316. For example, the recovery bladder 300 can be an integrated double bladder that defines separate internal compartments (i.e., the recovery body and the third bladder body 310). Through this configuration, the third bladder body 310 may provide structural stability during fluid recovery through the recovery body. However, in other embodiments, the recovery bladder 300 may include structural support members (not shown) internal and/or external to the bladder body 202.

Figure 6:
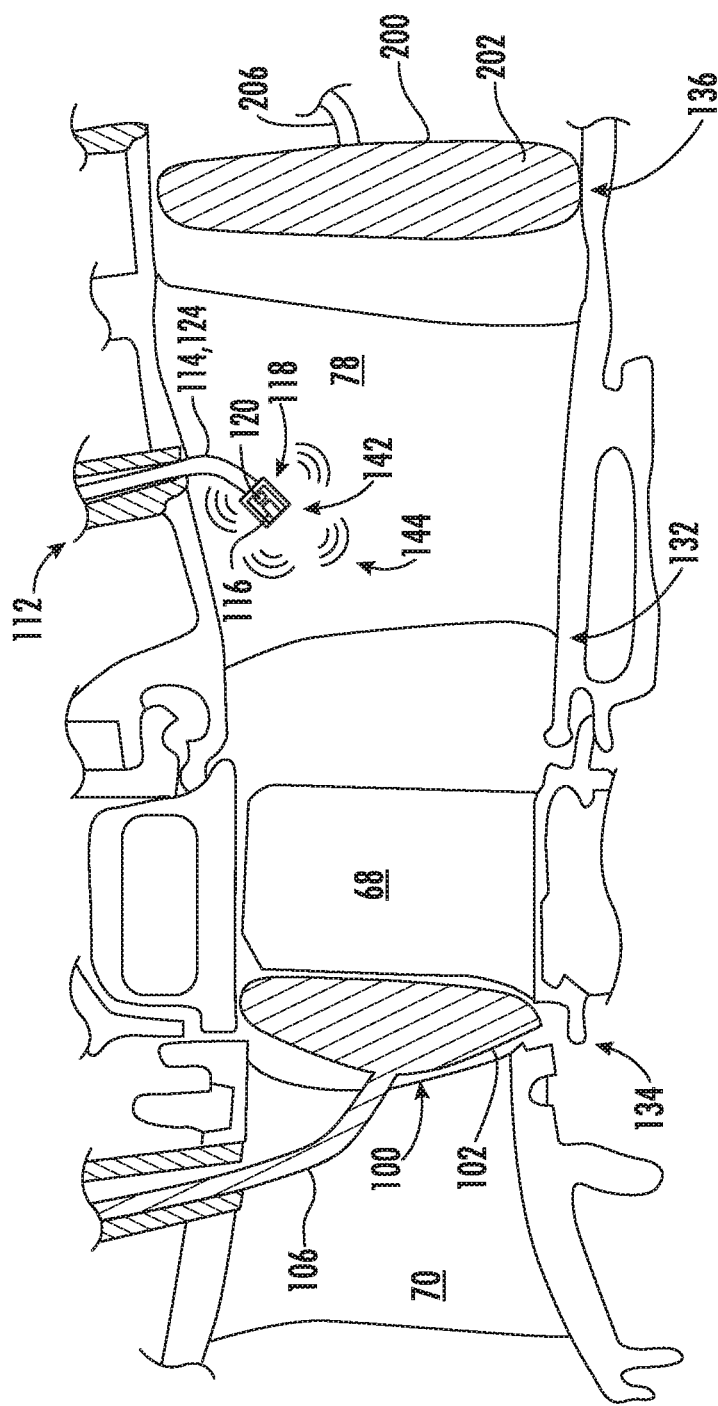
FIG. 6 illustrates a closer view of the ultrasonic tank of FIG. 2 according to aspects of the present disclosure, particularly illustrating an ultrasonic transmitter positioned in the ultrasonic tank.

Referring now to FIG. 6, a closer view of the ultrasonic tank 132 of FIG. 2 is illustrated in accordance with aspects of the present subject matter. In the depicted embodiment, the ultrasonic transmitter 116 has been positioned into the ultrasonic tank 132 defined by the first and second bladders 100, 200. It should be recognized that the ultrasonic transmitter 116 may be positioned inside the ultrasonic tank 132 by manipulating the extension member 114 using the articulation assembly 128 (see, e.g. FIG. 2). Further, in the illustrated embodiment, the ultrasonic transmitter 116 is positioned at the end 118 of the extension member 114. For example, in certain embodiments, the ultrasonic transmitter 116 may be contained in a sensor housing 142 at the end 118 of the cable 124. In the exemplary embodiment, the ultrasonic transmitter 116 emits ultrasonic waves 144 that propagate through the fluid medium (not shown). In certain embodiments, the ultrasonic waves may be targeted to a component of the turbomachine 10, such as one or more of the turbine blades 68 and/or the nozzle vanes 78.

In general, an ultrasonic transmitter 116 is a device that converts electric signals and/or energy into ultrasound. For example, the ultrasonic transmitter 116 may receive a signal communicated from the computer 122 to emit the ultrasonic waves 144. The ultrasonic waves 144 generally include sounds waves higher than the upper audible limit of human hearing. For example, ultrasonic waves 144 may include sounds waves at or above approximately 20 kilohertz. In certain embodiments, the ultrasonic waves 144 may include sound waves up to several gigahertz. In one embodiment, the ultrasonic waves 144 may generally be between approximately 150 kilohertz and 25 megahertz. The ultrasonic transmitter 116 may include a piezoelectric transducer that oscillates when a voltage is applied to the piezoelectric transducer. In another embodiment, the ultrasonic transmitter 116 may include capacitive transducers that use electrostatic fields between a conductive diaphragm and a backing plate. Still, in other embodiments, the ultrasonic transmitter 116 may include any combination of components capable of producing ultrasonic waves.

Figure 7:
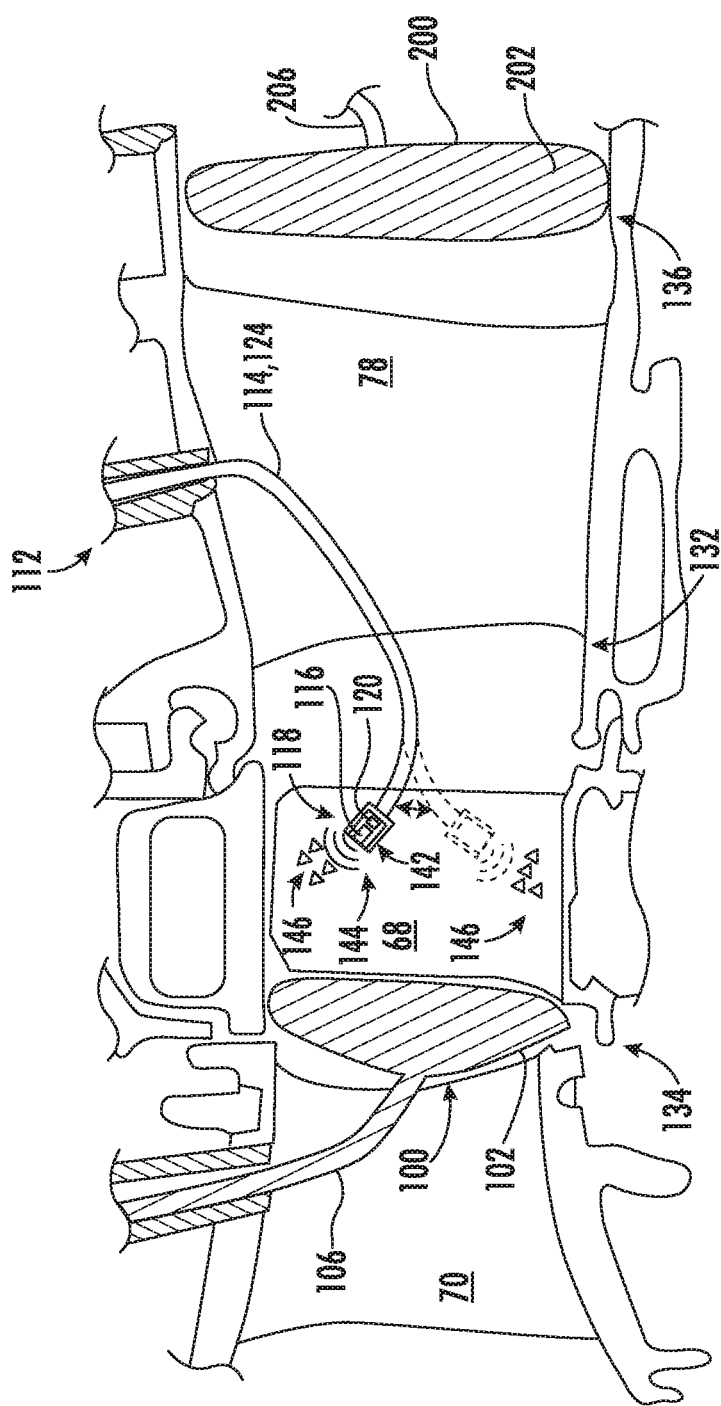
FIG. 7 illustrates a closer view of the ultrasonic tank of FIG. 2 according to aspects of the present disclosure, particularly illustrating the ultrasonic transmitter utilized to clean a component of the turbomachine.

Referring now to FIG. 7, a closer view of the ultrasonic tank 132 of FIG. 2 is illustrated according to aspects of the present subject matter. In particular, FIG. 7 illustrates the ultrasonic transmitter 116 used to clean a component of the turbomachine 10. In the depicted embodiment, deposit(s) 146 may adhere to a surface of a component, such as the turbine blade 68. The deposit(s) 146 may include sand, dirt, or grime ingested into the turbomachine 10. Additionally, the deposit(s) 146 may include carbon buildup left behind by the combustion products 60. As shown, the extension member 114 may be used to position the ultrasonic transmitter 116 near the deposit(s) 146. Further, the ultrasonic transmitter 116 may be substantially completely submerged within the fluid medium within the ultrasonic tank 132 and may emit the ultrasonic waves 144 directed toward the deposit(s) 146. For example, the ultrasonic waves 144 may propagate through the fluid medium (not shown) to the deposit(s) 146 to break them up. In certain situations, the deposits 146 may dissolve in the fluid medium. In other situations, the deposits 146 may settle into the fluid medium. It should be recognized that the deposits(s) 146 may be removed from the turbomachine 10 when the fluid medium is drained from the ultrasonic tank 132. In certain embodiments, the fluid medium may include a cleaning fluid.

As shown in phantom in FIG. 7, the ultrasonic transmitter 116 of the probe assembly 112 may be repositioned within the ultrasonic tank 132. For example, the extension member 114 may manipulate the position of the ultrasonic transmitter 116 from one location of the ultrasonic tank 132 to another. In the depicted embodiment, the ultrasonic tank 132 may be repositioned from one grouping of deposits 146 to another grouping of deposits 146. It should be recognized that the ultrasonic transmitter 116 may be repositioned to any location within the ultrasonic tank 132 and for any purpose, such as cleaning, inspecting, or modeling of components of the turbomachine 10.

Figure 8:
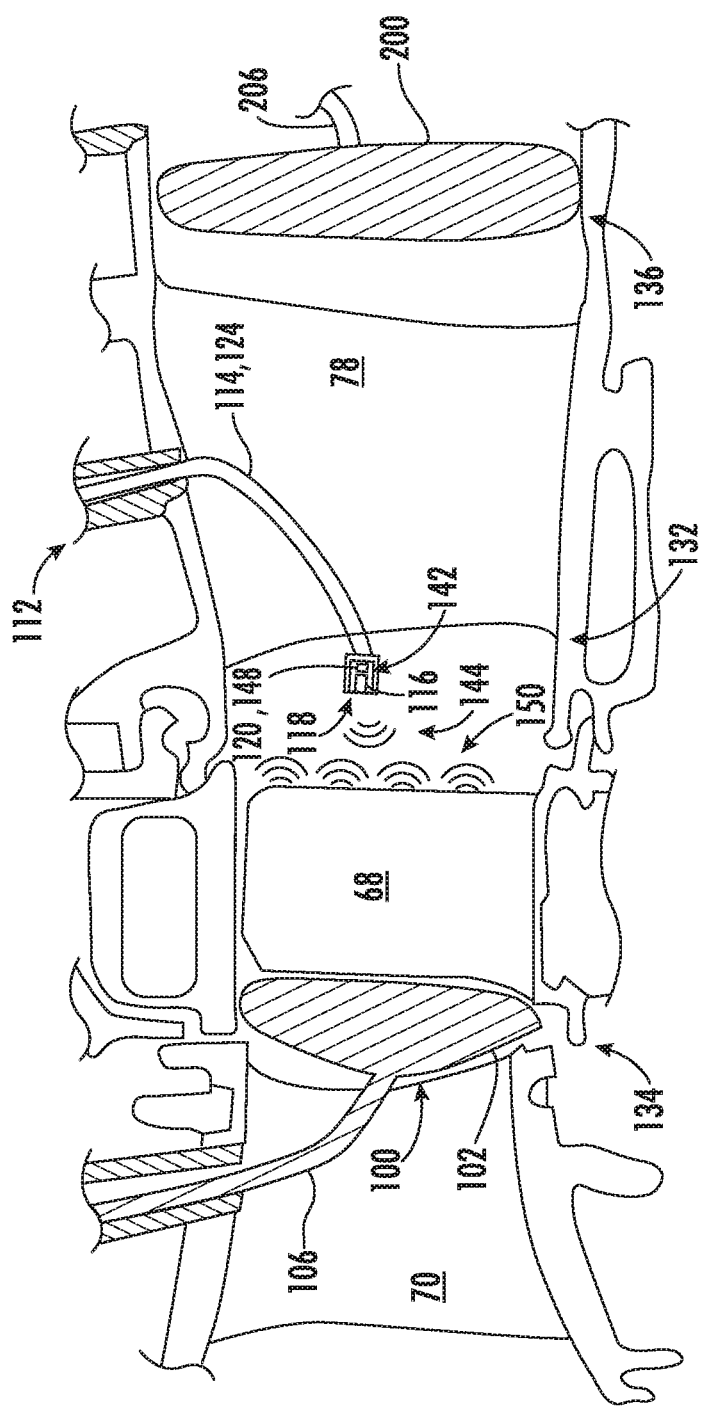
FIG. 8 illustrates a closer view of the ultrasonic tank of FIG. 2 according to aspects of the present disclosure, particularly illustrating an ultrasonic receiver positioned in the ultrasonic tank.

Referring now to FIG. 8, a closer view of the ultrasonic tank of FIG. 2 is illustrated according to aspects of the present disclosure. In particular, FIG. 8 illustrates an ultrasonic receiver 148 used to inspect and/or model components of the turbomachine 10. In the depicted embodiment, the probe assembly 112 includes the ultrasonic receiver 148 coupled to or positioned within the extension member 114. For example, the ultrasonic receiver 148 may be positioned at the end 118 of the extension member 114, such as contained within the sensor housing 142. The ultrasonic receiver 148 is configured to receive at least a portion of the ultrasonic waves 144 after the ultrasonic waves 144 have reflected off of the turbomachine 10. For example, the ultrasonic receiver 148 may sense data indicative of reflected ultrasonic waves 150 off of the component of the turbomachine 10. It should be recognized that, in certain embodiments, the ultrasonic receiver 148 may be one of the sensors 120 as described in regards to FIGS. 2 and 3. Further, the ultrasonic receiver 148 may be communicatively coupled to the computer 122, such as via the cable 124, and communicate the data indicative of the reflected ultrasonic waves 150 to the computer 122. In the depicted embodiment, the ultrasonic receiver 148 has been positioned into the ultrasonic tank 132 by manipulating the extension member 114, such as via the articulation assembly 128.

In general, an ultrasonic receiver 148 is a device that converts sound waves, such as ultrasonic waves, into electrical signals. For example, the ultrasonic receiver 148 may communicate a signal to the computer 122 representing data indicative of the reflected ultrasonic waves 150. In certain embodiments, the ultrasonic receiver 148 may include a piezoelectric transducer that generates a change in voltage when an oscillation (such as the reflected ultrasonic waves 150) is applied to the piezoelectric transducer. In another embodiment, the ultrasonic receiver 148 may include capacitive transducers that use electrostatic fields between a conductive diaphragm and a backing plate to register the reflected ultrasonic waves 150. Still, in other embodiments, the ultrasonic receiver 148 may include any combination of components capable of sensing ultrasonic waves. In certain embodiments, the ultrasonic transmitter 116 and the ultrasonic receiver 148 may be one component, such as an ultrasonic transceiver.

In certain embodiment, the computer 122 may build a model of at least a portion of the turbomachine 10 using the data indicative of the reflected ultrasonic waves 150. For example, the computer 122 may utilize the data indicative of the reflected ultrasonic waves 150 sensed by the ultrasonic receiver 148 to form the model. In certain embodiments, the combination of the ultrasonic transmitter 116 and the ultrasonic receiver 148 may be used to map a component of the turbomachine 10 or a section of the turbomachine 10. Further, in certain embodiments, the computer 122 may inspect the data indicative of the reflected ultrasonic waves 150 for an undesirable characteristic on the component or the turbomachine 10. For example, certain applications of non-destructive evaluation may use ultrasonic waves to determine defects on a component. Further, the data indicative of the reflected ultrasonic waves 150 may be able to indicate at least one of damage to the component, wear to the component, or build-up of deposits 146 on the component. In certain embodiments, the reflected ultrasonic waves 150 may be used to determine the location of deposits 146, and, subsequently, the ultrasonic transmitter 116 may be positioned to emit ultrasonic waves 144 to break-up the deposits 146.

Figure 9:
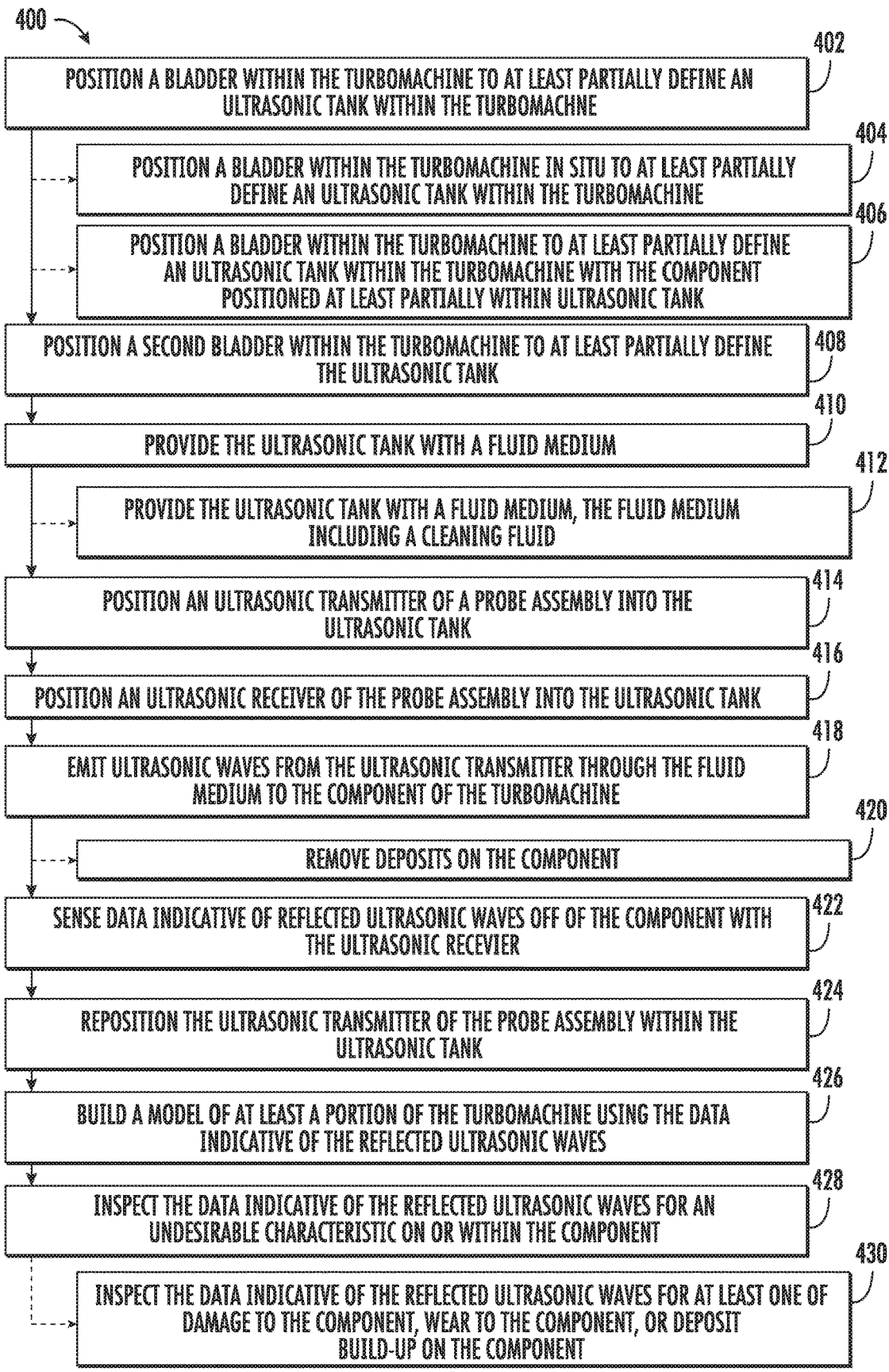
FIG. 9 depicts one embodiment of a method for performing ultrasonic procedure within the turbomachine.

Referring now to FIG. 9, one embodiment of a method (400) is depicted for performing ultrasonic procedures within a turbomachine 10 including a component. It should be recognized that the method (400) may be utilized with any turbomachine 10, such as, but not limited to, the turbomachine 10 of FIG. 1. Further, the method (400) may be utilized with the ultrasonic system 110 described in regards to FIGS. 2-8 or with any other capable system.

The method (400) includes, at (402), positioning a bladder within a turbomachine to at least partially define an ultrasonic tank within the turbomachine. In certain embodiments, the turbomachine may be in situ such as at (404). It should be recognized that performing ultrasonic procedures with the turbomachine in situ may reduce the costs of the ultrasonic procedures, the complexity of the ultrasonic procedures, and the turbomachine downtime. Still in other embodiments, the turbomachine may be off-wing and may also be partially or fully disassembled. In some embodiments, as shown at (406), the component is at least partially within the ultrasonic tank. For example, the component may be any of the rotatable blades or fixed stators as described in FIGS. 2 and 3. In one embodiment, the bladder is a first bladder. In such embodiments, at (408), the method (400) may include positioning a second bladder within the turbomachine to at least partially define the ultrasonic tank. It should be recognized that one or both of the bladders may be inflated to form a circumferential seal with the turbomachine. At (410), the method (400) includes providing the ultrasonic tank with a fluid medium. In certain embodiments, the fluid medium may include a cleaning fluid, as shown at (412).

The method (400) includes at (414) positioning an ultrasonic transmitter of a probe assembly into the ultrasonic tank. At (418), the method (400) includes emitting ultrasonic waves from the ultrasonic transmitter through the fluid medium to the component of the turbomachine. In one embodiment, as shown at (420), emitting ultrasonic waves from the ultrasonic transmitter through the fluid medium to the component of the turbomachine includes removing deposits on the component. In still further embodiments, at (424) the method (400) may include repositioning the ultrasonic transmitter of the probe assembly within the ultrasonic tank. For example, the ultrasonic transmitter may be repositioned to better target deposits or to remove additional deposits.

In some embodiments, as shown at (416), the method (400) may include positioning an ultrasonic receiver of a probe assembly into the ultrasonic tank. In such embodiments, the method (400) may further include at (422) sensing data indicative of reflected ultrasonic waves off of the component with the ultrasonic receiver. In further embodiments, as shown at (426), the method (400) may include building a model of at least a portion of the turbomachine using the data indicative of the reflected ultrasonic waves. At (428), the method (400) may further include inspecting the data indicative of the reflected ultrasonic waves for an undesirable characteristic on or within the component. As shown at (430), the undesirable characteristic may include at least one of damage to the component, wear to the component, or deposit build-up on the component.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for performing ultrasonic procedures within a turbomachine, the system comprising:
    a first bladder including a first bladder body for positioning within the turbomachine through a first access port, wherein the first bladder is inflatable to at least partially define an ultrasonic tank within the turbomachine for containing a fluid medium;
    a probe assembly including an extension member and ultrasonic transmitter, the ultrasonic transmitter coupled to or positioned within the extension member, the extension member insertable, through a second access port spaced apart from the first access port, into the ultrasonic tank for positioning the ultrasonic transmitter within the ultrasonic tank; and
    a second bladder including a second bladder body for positioning within the turbomachine through a third access port spaced apart from the first and second access ports, wherein the second bladder body is inflatable to at least partially define the ultrasonic tank.

2. The system of claim 1, wherein the first bladder is configured to be positioned at an upstream location within the turbomachine and the second bladder is configured to be positioned at a downstream location within the turbomachine to define the ultrasonic tank therebetween.

3. The system of claim 2, wherein the turbomachine comprises a component, and wherein the first bladder is configured to be positioned upstream of the component and the second bladder is configured to be positioned downstream of the component for at least one of ultrasonic cleaning, inspection, or modeling of the component.

4. The system of claim 1, wherein the probe assembly further includes an ultrasonic receiver coupled to or positioned within the extension member and configured to receive at least a portion of ultrasonic waves after the ultrasonic waves have reflected off the turbomachine.

5. The system of claim 1, wherein the system further comprises:
    a fluid source fluidly coupled to the bladder for inflating the bladder.

6. The system of claim 1, wherein the bladder comprises at least one of a plastic material, a film, a fibrous web, a rubber material, or a paper material.

7. The system of claim 1, wherein the fluid medium comprises a cleaning fluid.

8. The system of claim 1, wherein the probe assembly is a snake arm assembly, and wherein the extension member is a snake arm of the snake arm assembly.

9. A method for performing an ultrasonic procedure within a turbomachine comprising a component, the method comprising:
    positioning a first bladder within the turbomachine through a first access port to at least partially define an ultrasonic tank within the turbomachine;
    providing the ultrasonic tank with a fluid medium;
    positioning an ultrasonic transmitter of a probe assembly into the ultrasonic tank through a second access port spaced apart from the first access port;

positioning a second bladder within the turbomachine through a third access port spaced apart from the first and second access ports to at least partially define the ultrasonic tank; and emitting ultrasonic waves from the ultrasonic transmitter through the fluid medium to the component of the turbomachine.

10. The method of claim 9, wherein the turbomachine is in situ.

11. The method of claim 9, wherein the component is positioned at least partially within the ultrasonic tank.

12. The method of claim 9, further comprising:
repositioning the ultrasonic transmitter of the probe assembly within the ultrasonic tank.

13. The method of claim 9, wherein emitting ultrasonic waves from the ultrasonic transmitter through the fluid medium to the component of the turbomachine includes removing deposits on the component.

14. The method of claim 9, further comprising:
positioning an ultrasonic receiver of the probe assembly into the ultrasonic tank; and
sensing data indicative of reflected ultrasonic waves off of the component with the ultrasonic receiver.

15. The method of claim 14, further comprising:
inspecting the data indicative of the reflected ultrasonic waves for an undesirable characteristic on or within the component.

16. The method of 15, wherein the undesirable characteristic is at least one of damage to the component, wear to the component, or deposit build-up on the component.

17. The method of 14, the method further comprising:
building a model of at least a portion of the turbomachine using the data indicative of the reflected ultrasonic waves.

18. A turbomachine assembly comprising:
a turbomachine having a component; and
an ultrasonic system comprising:
a first bladder including a first bladder body positioned within the turbomachine through a first access port, wherein the first bladder is inflatable to at least partially define an ultrasonic tank within the turbomachine for containing a fluid medium;
a probe assembly including an extension member and ultrasonic transmitter, the ultrasonic transmitter coupled to or positioned within the extension member, the extension member insertable, through a second access port spaced apart from the first access port, into the ultrasonic tank for positioning the ultrasonic transmitter within the ultrasonic tank; and
a second bladder including a second bladder body positioned within the turbomachine through a third access port spaced apart from the first and second access ports wherein the second bladder body is inflatable to at least partially define the ultrasonic tank.

* * * * *